United States Patent [19]
Karamian

[11] 3,836,334
[45]*Sept. 17, 1974

[54] SEPARATORY FUNNEL
[76] Inventor: Narbik A. Karamian, 5117 Wilson Ln., Bethesda, Md. 20014
[ * ] Notice: The portion of the term of this patent subsequent to Jan. 30, 1991, has been disclaimed.
[22] Filed: Mar. 12, 1973
[21] Appl. No.: 340,108

[52] U.S. Cl............ 23/259, 23/292, 210/534, 210/535
[51] Int. Cl............................ B01d 17/02
[58] Field of Search...... 23/259, 253, 292; 210/534, 210/535

[56] References Cited
UNITED STATES PATENTS

| | | |
|---|---|---|
| 3,257,170 | 6/1966 | Marcus et al. ............... 23/259 |
| 3,656,912 | 4/1972 | Sugawara ..................... 23/259 |
| 3,713,778 | 1/1973 | Karamian ..................... 23/259 |

Primary Examiner—R. E. Serwin
Attorney, Agent, or Firm—Joseph P. Nigon

[57] ABSTRACT

A separatory funnel particularly useful for preparing samples to be fed as a solution of a salt in an organic solvent for analysis of trace elements, for example, by atomic absorption spectrometry. The device consists of a specially designed flask structure and an adjustable conduit which extends up into the flask portion of the separatory funnel for removing the upper liquid layer. For removing the lower liquid layer the same conduit extending up into the flask may be used.

6 Claims, 4 Drawing Figures

3,836,334

SEPARATORY FUNNEL

BACKGROUND OF THE INVENTION

U.S. Pat. No. 3,713,778, issued Jan. 30, 1973, discloses a separatory funnel wherein either an upper liquid layer or a lower liquid layer can be selectively removed. The instant application covers an improvement over this separatory funnel in that it provides a novel flask structure that adapts the separatory funnel described in U.S. Pat. No. 3,713,778 for preparing samples for analysis by atomic absorption spectrometry.

It is frequently important to analyze solutions that contain elements in the form of impurities, such as trace metals, for example, that are present in parts per billion quantities. This analysis is conveniently carried out by concentrating the impurities by means of a solvent extraction step. This solvent extraction is carried out by adding a chelating agent, for example, that effectively complexes the impurities such as trace metals, for example. A buffer solution is normally added and the chelated metals are then extracted from the large solution volume into a small organic solvent volume. If the volume of solution and the volume of solvent are very carefully controlled, the impurities can be quantitatively concentrated from parts per billion or lower to parts per million concentration level. The analysis is completed by feeding the organic layer containing the extracted chelated impurities into an atomic absorption spectrometer. The atomic absorption spectrometer completes the analysis. The total concentration of the metals in the unknown solution is then easily calculated based on the relative ratio of the volumes of the solution and the solvent containing the trace elements.

The device consists of a three-chambered flask that is designed to be attached to the conduit means structure. In a typical flask of this type the largest chamber has a volume of about 200 ml. The second chamber is carefully calibrated and has a volume of about one-twentieth the volume of the largest chamber. The volume of the third chamber is unimportant since its function is to facilitate mixing of the solvent with the liquid to be extracted. The volumes given above for the two chambers are illustrative only and can be larger or smaller so long as a specified relationship between the large chamber and the calibrated chamber is maintained.

The three chambers of the flask are continuous. There are no barriers between the chambers. The conduit means extends upwardly from the lower portion of the bottom surface of the flask. The conduit is adjustable in regards to essentially any position in the vertical height of the flask and includes a valve means such as a stopcock at the lower portion of the conduit, preferably below the bottom surface of the container flask. The function of this conduit is to remove at least part of the upper layer of a two immiscible layer system. By being able to adjust the vertical height of this conduit all or part of the upper layer may be removed. By lowering the conduit to the region of the bottom of the container flask the lower layer can be removed.

Thus, it is possible to extend the conduit into the carefully calibrated second chamber to remove the organic solvent containing the chelated metals, for example, into another container where the plastic caPillary from the nebulizer of the atomic absorption unit is dipped into this organic phase.

Alternatively, the liquid in the lower portion of the flask can be completely removed and the flask refilled with an additional volume of solution, containing an organic chelating agent. This extraction can be repeated and the concentration of the chelated metal impurities in the organic solvent can be increased.

It is, therefore, a prime object of this invention to set out an improvement over the separatory funnel disclosed in U.S. Pat. No. 3,713,778, that is particularly useful for accurate solvent extraction of trace elements for analysis by atomic absorption spectrometry.

It is additionally an object of this invention to disclose a specially designed separatory funnel device where each layer may be separated using separate conduit means for each layer that avoids contamination between the liquids in the layers.

It is also an object to this invention to describe a separatory funnel device that can be operated easily and rapidly and that can be used to concentrate the trace metals in various liquids from parts per billion or lower to parts per million, or higher, concentration.

These and other objects will be more fully described and explained with reference to the drawings and detailed disclosure of this specification.

FIG. 1 has a front elevational view of the three-chambered flask structure.

FIG. 2 has a front elevational view showing the three-chambered flask structure attached to the separatory apparatus wherein the conduit means is positioned to remove the organic solvent layer and the conduit means is adjusted upwardly or downwardly by means of an internally threaded structure.

Figure 1:
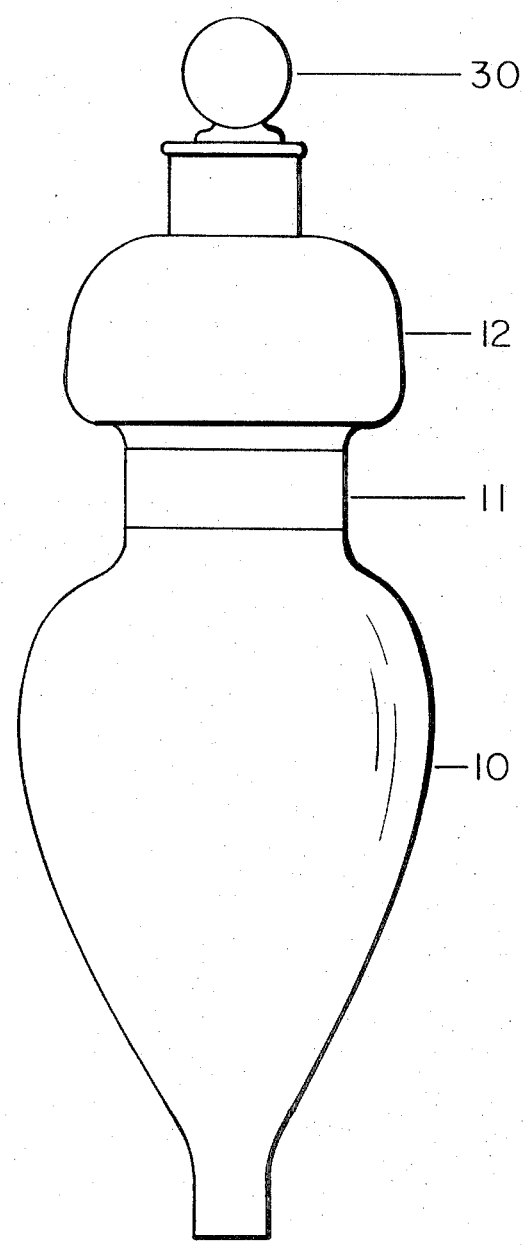

In more detail, FIG. 1 shows the three-compartmented flask structure. The largest compartment 10 is carefully calibrated to contain a volume of liquid having a direct relationship in volume to the intermediate carefully calibrated section 11. The volume of section 12 is not important. It facilitates complete mixing of the two immiscible liquids for extraction when the flask is agitated. The volume dimension of the chamber 10 is unimportant so long as there is a direct relationship to the volume of the carefully calibrated chamber 11.

Figure 2:
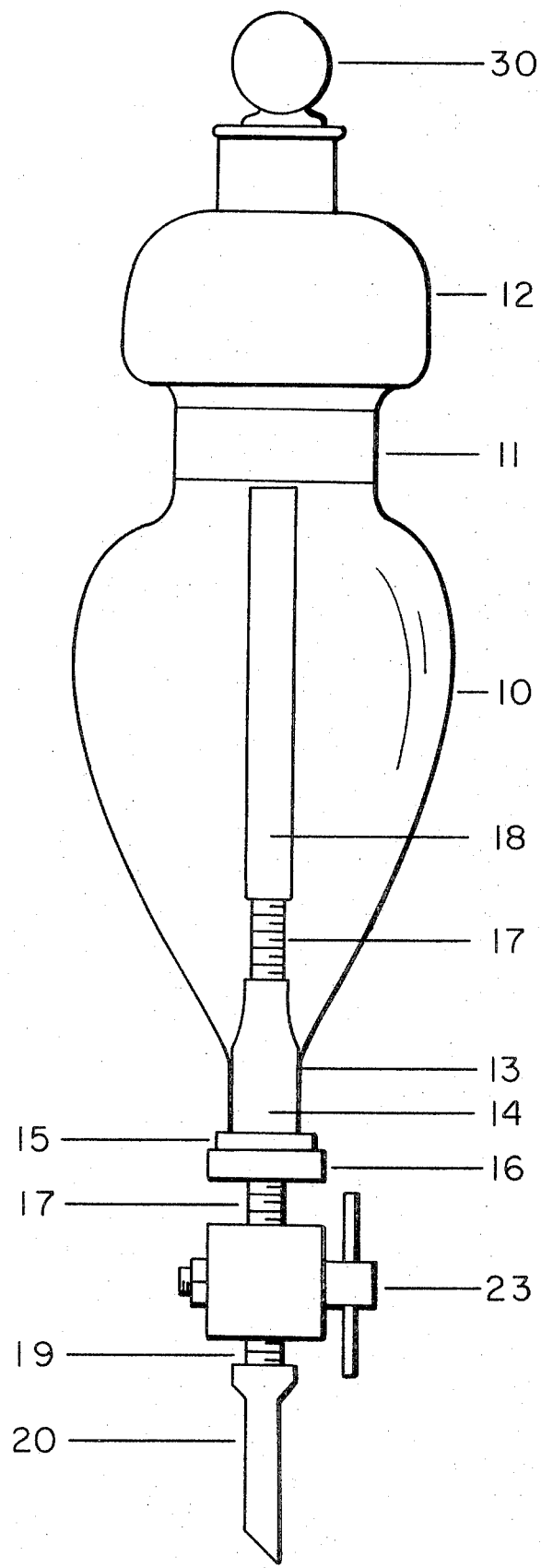

In more detail, FIG. 2 shows the separatory flask attached at 13 to the fitted plug 14. The three-chambered flask structure includes a stopper closure 30 at the upper end. The fitted plug, 14, having internal threads is sealed against leakage by the washer, 15. Lock nut device, 16, holds the lower portion, 13, in contact with the washer, 15. In the embodiment of this FIGURE the threaded conduit, 17, passes through the threaded plug, 14, up into the container section of the separatory flask. In the embodiment of this FIGURE the threaded conduit, 17, carries a removable extension, 18. The extension tube increase the height of the third conduit to the region within the container section of the separatory funnel where the division of the layers is expected. By adjustment to the exact level of the division of liquids is made by rotating the conduit, 17, which then by the threaded plug, 14, raises or lowers the top of the extension tube, 18, which is open. At the lower end of the conduit 17, a portion, 19, which may be threaded so as to accept an extension stem, 20. Therefore, on adjustment to the conduit, 17, with the extension tube, 18, to the appropriate level, followed by opening of the stopcock valve, 23, the contents of the carefully calibrated chamber, 11, can be rapidly removed.

Figure 3:
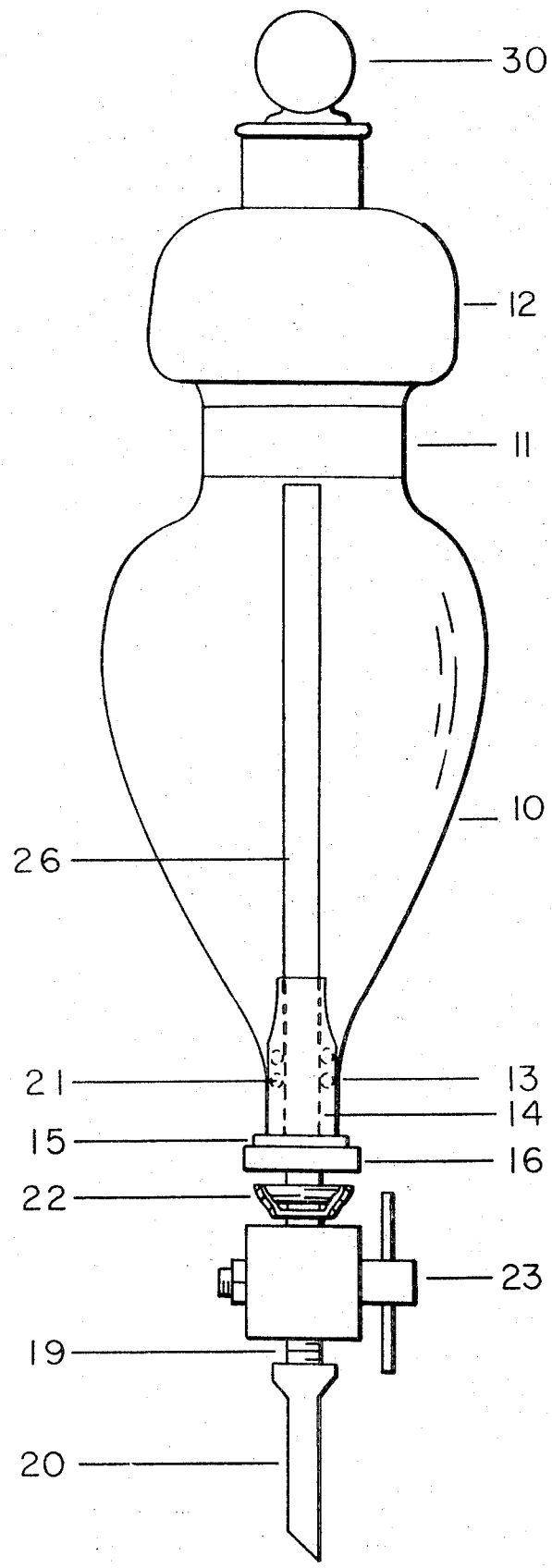
FIG. 3 shows the separatory funnel utilizing a structure showing the slideable adjusting means for the conduit.
Figure 4:
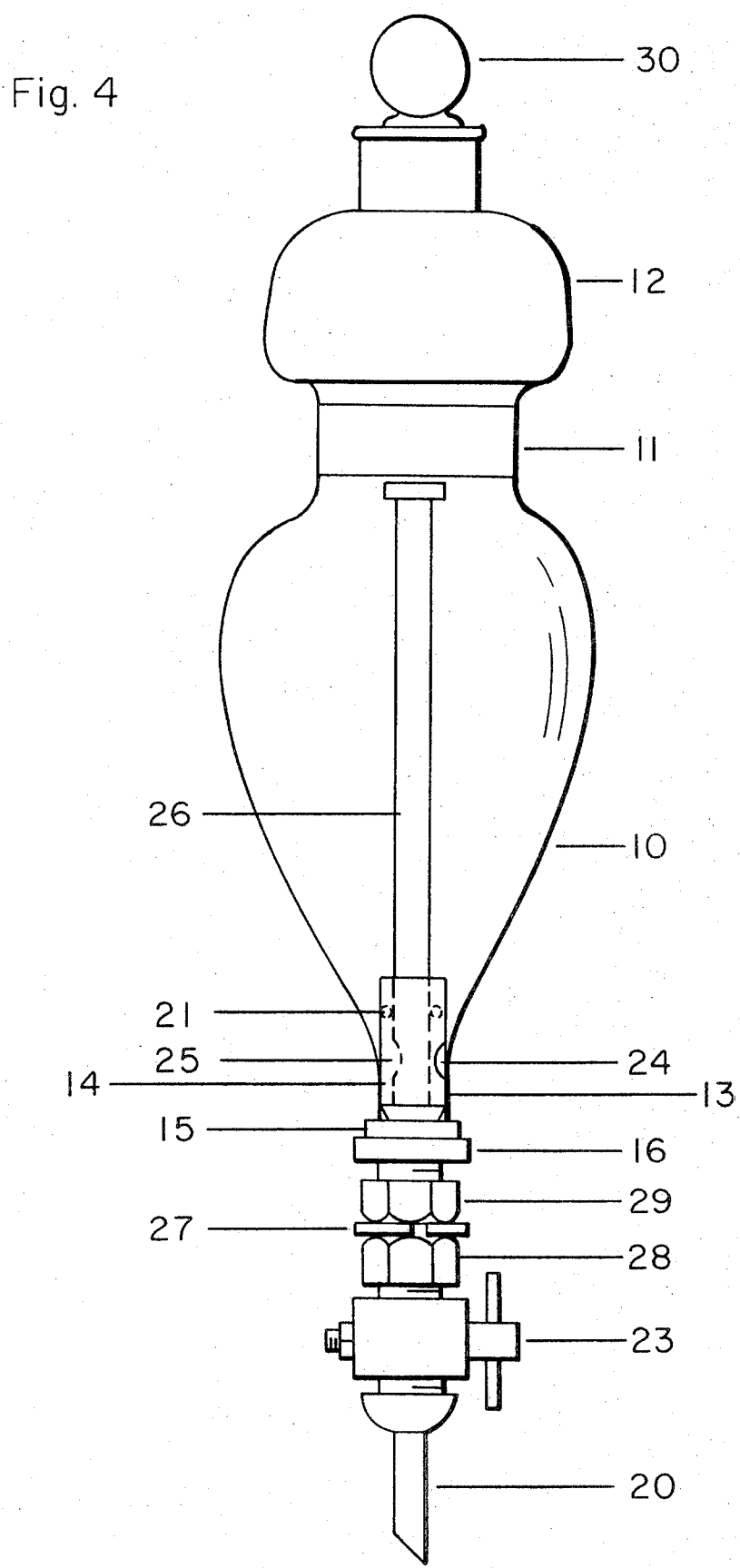
FIG. 4 is a front elevational view of the separatory funnel having a single valve and a drain means for removing the upper or lower layer.

FIG. 3 discloses an embodiment wherein the flask has a plug 14 in the lower portion 13 of the first compartment, 10, of the flask which is not threaded. The conduit 26 is slidably adjustable in the plug, 14, and is sealed in the plug, 14, optionally using the O-ring, 21. The sealing method of a plug to lower portion of the container, is the same as in FIG. 2, and is also the stopcock valve arrangement. In this embodiment, however, the height of the conduit is adjusted by a sliding movement and then locked into position by a flair nut, 22. After being locked into position so that the top of the conduit, 26, is in the liquid layer in the second compartment, 11, this upper layer can rapidly be removed. By lowering the conduit, the lower layer can also be removed FIG. 4 illustrates another embodiment of the separatory funnel wherein the same conduit, 26, and stopcock and valve, 23, is utilized for the removal of the liquid collected in the second compartment, 11, and the lower layer in compartment 10. In this embodiment, the plug, 14, is maintained and sealed in the lower portion, 13, by the same means as is shown in FIG. 2, and FIG. 3, that is, the plug 14, is maintained and sealed in the lower portion 13, by a washer 15, and lock nut, 16. The conduit, 26, is slideably adjustable in plug 14 and may optionally contain an O-ring seal, 21. If an O-ring seal is not used, the conduit, 26, should be of close fit in plug 14. In the lower part of the conduit, 26, within the plug, 14, there is a drainage hole, 25, which is brought into alignment with the drain plug hole, 24, when it is desired to remove a liquid layer in the first compartment 10. When not in alignment the liquid layer compartment 11 can be removed. This alignment can be accomplished by removing the disc lock washer, 27, moving the conduit, 26, upwardly until the flair nuts, 28 and 29, meet and then rotating in the conduit 26.

The operation of the separatory funnels is self-explanatory. However, an extraction using a separatory funnel of FIG. 4 will be described.

When a solution containing parts per billion quantities or lower of trace metals is to be analyzed, the sample is poured into the section 10. Care is exercised to assure that the volume of the sample is known by filling the lower compartment to the bottom line of the second compartment. An agent for chelating the metal ions such as ammonium pyrrolidine dithiocarbamate for example is added to the solution. A suitable organic solvent for the chelating agent such as diethyl ether or methyl isobutyl ketone is added to the upper line of the second compartment, 11, and the extraction completed by placing the stopper, 30, on the flask and agitating the co-mixture using the third compartment 12 to facilitate this mix. The mixture is allowed to stand until the diethyl ether layer is separated and collected in the compartment 11. This layer contains the chelated metals in carefully controlled volume. During this procedure the drain holes, 24 and 25, are not in alignment. The flair nut, 29, is then loosened in the height of the conduit, 26, adjusted to the bottom line of the compartment 11. The flair nut is then tightened to maintain this adjustment. The upper diethyl ether layer is then removed by opening the stopcock, 23.

Alternatively, the aqueous layer may be removed from the flask by aligning holes, 24 and 25, and draining via the stopcock, 23. This alignment is accomplished by manipulation of conduit, 26, flair nuts, 29, and the lock washer, 27. An additional charge of the chelates containing liquid sample can then be added and the extraction repeated to increase the concentration of the chelated metals in the diethyl ether layer in section 11.

The separatory devices of this invention may be construed using many suitable materials, they include glass or plastics, preferably the flask container a portion of glass or plastic with the conduit plug and stopcock valve being plastic. Various suitable plastics include, Teflon, nylon, polyvinyl chloride, polyethylene, polypropylene, polystyrene. Other plastics, however, may be used and are considered to be within scope of this invention.

What is claimed is:

1. A liquid separating device comprising a flask container having at least three compartments wherein two of said compartments have a definite volume relationship a conduit passing through the lower surface of said flask container and adjustably extending up into said flask container to a set height; and a conduit height adjusting means and valve means on the portion of said conduit below said lower surface of said flask container.

2. A device according to claim 1 wherein the two compartments having a definite volume relationship are continuous and are positioned one above the other.

3. A device according to claim 1 wherein the two compartments having a definite volume relationship comprise a compartment having a large volume and a compartment having a much smaller volume.

4. A device according to claim 3 wherein the volume relationship between the larger compartment and the smaller compartment is about 10 to 1 to 100 to 1.

5. A device according to claim 1 wherein said conduit height adjusting means comprises a threaded portion on said conduit which engages and passes through a plug seal in the bottom surface of the flask container whereby on rotation of said conduit the height of said conduit within said container flask is charged.

6. A device as in claim 1 wherein said conduit height adjusting means comprises a portion on said conduit which closely engages and passes through a plug seal in the bottom surface of the flask container whereby said conduit can be slideably moved within said plug seal thereby effecting the height adjustment of said conduit.

* * * * *